(12) United States Patent
Ahmed et al.

(10) Patent No.: US 9,268,018 B2
(45) Date of Patent: Feb. 23, 2016

(54) METHOD AND A DEVICE FOR EXTENDING THE ILLUMINATION OF A TEST OBJECT

(75) Inventors: Sherif Ahmed, Munich (DE); Christian Evers, Kirchheim (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 253 days.

(21) Appl. No.: 14/124,815

(22) PCT Filed: Nov. 4, 2011

(86) PCT No.: PCT/EP2011/069454
§ 371 (c)(1),
(2), (4) Date: Dec. 9, 2013

(87) PCT Pub. No.: WO2012/167847
PCT Pub. Date: Dec. 13, 2012

(65) Prior Publication Data
US 2014/0125517 A1     May 8, 2014

(30) Foreign Application Priority Data

Jun. 8, 2011 (DE) .......................... 10 2011 103 643
Jul. 1, 2011 (DE) .......................... 10 2011 078 539

(51) Int. Cl.
*G01S 13/90* (2006.01)
*G01S 13/89* (2006.01)
(Continued)

(52) U.S. Cl.
CPC . *G01S 13/90* (2013.01); *G01S 7/04* (2013.01); *G01S 7/411* (2013.01); *G01S 13/887* (2013.01); *G01S 13/888* (2013.01); *G01S 13/89* (2013.01); *G01S 13/9035* (2013.01); *G01V 8/005* (2013.01)

(58) Field of Classification Search
CPC .......... G01S 13/90–13/139094; G01S 13/887; G01S 13/888; G01S 13/89; G01S 7/04; G01S 7/411
USPC .......... 342/22, 25 R, 25 A, 25 B, 25 C, 25 D, 342/25 E, 25 F, 179, 195
See application file for complete search history.

(56) References Cited

U.S. PATENT DOCUMENTS 4,243,991 A * 1/1981 Woodward .............. G01S 13/42
                                                                    333/21 A
5,341,141 A * 8/1994 Frazier ...................... G01S 7/20
                                                                    342/129

(Continued)

FOREIGN PATENT DOCUMENTS

EP            2204671 A1     7/2010

OTHER PUBLICATIONS

International Search Report issued in corresponding application No. PCT/EP2011/069454 mailed Mar. 23, 2012.

*Primary Examiner* — Peter Bythrow
(74) *Attorney, Agent, or Firm* — Carter, DeLuca, Farrell & Schmidt, LLP (57) ABSTRACT

The present disclosure provides a method and a corresponding device for extending the illumination of an object under investigation. The object under investigation is illuminated with an electromagnetic microwave signal which is transmitted from a transmission antenna. The microwave signal reflected from the object under investigation is received by at least one reception antenna. An image of the object under investigation is reconstructed through synthetic focusing of the reflected microwave signal. At least one reflector element is arranged orientated towards the object under investigation and the microwave signals reflected from the reflector element and from the object under investigation are received in a reception antenna and used for the reconstruction of the image of the object under investigation in addition to the microwave rays from a transmission antenna which strike the object under investigation without reflection on the reflector element and are received by the reception antenna without reflection on the reflector element.

16 Claims, 8 Drawing Sheets

(51) Int. Cl.
  *G01S 13/88* (2006.01)
  *G01S 7/04* (2006.01)
  *G01S 7/41* (2006.01)
  *G01V 8/00* (2006.01)

(56) References Cited

U.S. PATENT DOCUMENTS

| | | | | |
|---|---|---|---|---|
| 5,369,410 | A * | 11/1994 | Reich | H01Q 3/2676 342/175 |
| 5,579,010 | A * | 11/1996 | Iihoshi | G01S 7/295 342/108 |
| 6,242,740 | B1 * | 6/2001 | Luukanen | G01J 3/2823 250/250 |
| 6,411,255 | B2 * | 6/2002 | Roederer | H01Q 3/22 342/371 |
| 6,958,738 | B1 * | 10/2005 | Durham | H01Q 3/2658 343/700 MS |
| 6,965,340 | B1 * | 11/2005 | Baharav | G01S 13/89 342/175 |
| 7,187,334 | B2 * | 3/2007 | Franson | H01Q 1/3233 343/700 MS |
| 7,795,587 | B2 * | 9/2010 | Mann | G02B 7/1821 250/341.1 |
| 7,804,442 | B2 * | 9/2010 | Ammar | G01S 13/887 342/179 |
| 7,843,383 | B2 | 11/2010 | Weems et al. | |
| 8,390,504 | B2 * | 3/2013 | Abdillah | G01S 7/412 342/22 |
| 9,063,231 | B2 * | 6/2015 | Loffler | G01S 13/426 |
| 2007/0139248 | A1 * | 6/2007 | Baharav | G01S 13/89 342/22 |
| 2008/0211713 | A1 * | 9/2008 | Jeck | G01S 13/02 342/25 A |
| 2009/0033556 | A1 * | 2/2009 | Stickley | G01S 13/003 342/374 |
| 2009/0224993 | A1 * | 9/2009 | Peichl | G01S 13/426 343/761 |
| 2010/0045514 | A1 * | 2/2010 | Bartscher | G01S 7/03 342/25 R |
| 2010/0182434 | A1 * | 7/2010 | Koch | G01S 7/4802 348/164 |
| 2011/0043403 | A1 * | 2/2011 | Loffler | G01S 7/02 342/25 A |
| 2011/0102233 | A1 * | 5/2011 | Johnson | G01S 13/003 342/22 |
| 2012/0049863 | A1 * | 3/2012 | Ostwald | G01S 7/411 324/642 |
| 2014/0028494 | A1 * | 1/2014 | Ksienski | G01S 13/887 342/25 A |

* cited by examiner

METHOD AND A DEVICE FOR EXTENDING THE ILLUMINATION OF A TEST OBJECT

The invention relates to a method and a device for extending the illumination of an object under investigation with an electromagnetic microwave signal.

Systems with microwaves and millimeter waves are being developed for the detection of objects made from non-metallic materials. While millimeter waves are only reflected slightly or not at all in air or under a covering of an object under investigation, by way of contrast, an almost complete reflection takes place with metallic objects and objects with a high water content such as the human skin and human tissue.

A method for detecting a concealed dielectric object is disclosed in DE 10 2009 040 450 A1. In this context, a microwave signal with a given bandwidth is generated and transmitted by transmission antennas in the direction towards the object under investigation, for example, a human body of which the clothing conceals a sought object. These microwave signals are reflected on the human body and also on objects kept concealed under the clothing and received in several associated reception antennas. The focusing of the received microwave radiation on the three-dimensional contour of the object under investigation is achieved through a synthetic focusing, for example, at the transmitter end with a digital beam-forming algorithm and/or with a receiver-end focusing by measuring the modulus and phase of the reflected millimeter waves.

In the case of an irradiation with microwaves in the near range, an image of such strongly reflecting objects shows a reduced illumination of the edge regions as a result of the strong reflection of the radiation at a smooth surface. Accordingly, the region of an object under investigation which is visible in an image is restricted. This is conventionally achieved by enlarging the transmission/reception aperture, that is, by enlarging the area on which the transmission and reception antennas are arranged. However, such a large-area antenna arrangement is associated with high costs and achieves only a limited extension of the visible and illuminated region of the object under investigation.

Accordingly, the object of the invention is to provide a method and a device which allow/s a significant extension of the illumination of an object under investigation without cost-intensive enlargement of the transmission/reception equipment and which is therefore cost favourable.

This object is achieved by the method according to claim 1 and the device according to claim 11. Advantageous further developments of the method according to the invention and respectively the device according to the invention are specified in the dependent claims.

With the method according to the invention for extending the illumination of an object under investigation, an object under investigation is illuminated with an electromagnetic microwave signal which is transmitted from a transmission antenna. The microwave signal reflected from the object under investigation is received by at least one reception antenna. An image of the object under investigation is reconstructed through synthetic focusing of the reflected microwave signals. According to the invention, at least one reflector element is arranged orientated towards the object under investigation.

The microwave signals reflected from the reflector element and from the object under investigation are preferably received in a reception antenna and used for the reconstruction of the image of the object under investigation in addition to the microwaves from a transmission antenna which strike the object under investigation without reflection on the reflector element and are received by the reception antenna without reflection on the reflector element.

A reflector element which is embodied, for example, as a metallic arrangement or provides a metallised surface on which the microwave signals are strongly reflected is available at low cost and can be orientated towards the object under investigation in a simple and optionally variable manner. With the reflector element, a considerably larger proportion of the transmitted signals is used for the reconstruction.

Furthermore, it is advantageous if those microwave signals are used for the synthetic focusing which are transmitted from a transmission antenna then reflected from the reflector element to the object under investigation and reflected from the object under investigation to a reception antenna, and/or those microwave signals are used which are transmitted from a transmission antenna, reflected from the object under investigation in the direction towards the reflector element and reflected from the reflector element to a reception antenna, and/or those microwave signals are used which are transmitted from a transmission antenna then reflected from a reflector element to the object under investigation, reflected from the object under investigation to the reflector element and from there to a reception antenna.

Accordingly, all of the signals which are reflected up to three times on their way to the reception antenna, are used for the synthetic focusing and accordingly for the reconstruction of an image of the object under investigation. In this context, it is particularly advantageous that the additionally gained proportion of the received signals supplies information about previously non-illuminated surface regions of the object under investigation and therefore an image of this surface region can be reconstructed.

It is also advantageous if a virtual position of the transmission antenna is determined through reflection of the real position of the transmission antenna on the reflector element, and a virtual position of the reception antenna is determined through reflection of the real position of the reception antenna on the reflector element. Such a virtual position of the transmission or respectively reception antenna considerably simplifies an algorithm for the synthetic focusing of the signals. The term for the calculation of the image can be retained without change, only the number and position of the transmission and respectively reception antennas is extended.

It is also advantageous if only those microwave signals received in the at least one reception antenna which are received within a first time-window of which the limits are formed by the minimal and respectively maximal delay time of a microwave signal which is reflected from a virtual transmission antenna via the object under investigation to a real reception antenna or from a real transmission antenna via the object under investigation to a virtual reception antenna, is allocated in the synthetic focusing to a virtual transmission antenna and a real reception antenna or respectively to a real transmission antenna and a virtual reception antenna. This achieves a pre-selection of the received microwave signals which can be transmitted or received by a virtual transmission antenna or a virtual reception antenna. Accordingly, the calculation time for evaluating the received microwave signals is shortened, and the occurrence of artefacts or interference components in the image is reduced.

The microwave signals received in the reception antennas which are received within a second time-window are advantageously allocated in the synthetic focusing to a real transmission antenna or a real reception antenna, whereas the limits of the second time-window are formed by the minimal and maximal delay time of a microwave signal which is reflected from a real transmission antenna via a virtual object under investigation reflected on the reflector element to a real reception antenna. As a result of this pre-selection of the received microwave signals which are reflected from a reflected virtual object under investigation, the calculation time for the synthetic focusing is also shortened and artefacts in the image are avoided.

It is also advantageous if the determined position of the virtual object under investigation is allocated to a real position of the object under investigation by reflection on the reflector element. As a result of this simple operation, a further region of the object under investigation is determined in its real position. A significantly extended region of the object under investigation is displayed through images which have been determined from the microwave signals in the first and second time-window. Accordingly, using the microwave signals reflected on the reflector element, concealed objects can be detected in a region of the object under investigation not previously imaged.

It is also advantageous if the microwave signals which are received in the first and second time-window are provided with a weighting factor which compensates the attenuation of the microwave signal in the case of a reflection on the reflector element and the attenuation of the microwave signal resulting from an increased delay time in air. Accordingly, the image of the object under investigation from the reflector element is matched in its display, for example, its brightness, to the image of the object under investigation from the microwave signals not reflected on the reflector element.

Several reflector elements are advantageously positioned orientated towards the object under investigation, and the microwave signals reflected from respectively from a reflector element and from the object under investigation and/or the microwave signals reflected via several reflector elements and from the object under investigation are received in a reception antenna and used for the reconstruction of the image of the object under investigation. For example, a first reflector element can be positioned orientated at the side of the object under investigation, and a second reflector element can be positioned above the object under investigation, so that different surface regions of the object under investigation are illuminated by different reflector elements, and the reflected microwave signals can be used for the reconstruction of the image. Accordingly, an image of the object under investigation can be extended by several regions at the same time with a single measurement.

In this context, it is advantageous if several reflector elements are arranged respectively at a different spacing distance from the object under investigation, so that the delay time of the microwave signals capable of being used for the reconstruction of the image and reflected from different reflector elements do not overlap. This allows a pre-selection of the received microwave signals in a time-window corresponding to the procedures already described.

Moreover, it is advantageous if the reflector element comprises at least three regions separated from one another which each provide a diffuse reflecting surface, and the position and distance of the reflector element is determined from the microwave radiation which is reflected from these regions. Accordingly, the position and distance of the reflector element can be determined with the same algorithm which is used for the reconstruction of an image of the object under investigation, and accordingly, the arrangement can be calibrated. For example, if the reflector element is displaced between two measurements, the new position and distance of the reflector element can be determined automatically and used in the calculation for the synthetic focusing.

A device according to the invention for extending the illumination of an object under investigation corresponding to the above named method comprises at least one transmission antenna which transmits an electromagnetic microwave signal in the direction towards an object under investigation, at least one reception antenna which receives the microwave signal reflected from the object under investigation and a processing unit which reconstructs an image of the object under investigation from the reflected microwave signal through synthetic focusing. According to the invention, at least one reflector element is arranged orientated towards the object under investigation.

It is advantageous if the position of the reflector element is variable. As a result, for example, successive measurements can be implemented with a different position of the reflector element, and accordingly, different regions of the surface of the object under investigation can be illuminated and displayed for every measurement.

It is similarly advantageous if several reflector elements are arranged orientated towards the object under investigation. In particular, the several reflector elements are positioned orientated at different sides orientated towards the object under investigation and therefore allow different perspectives of the object under investigation and its image in a single irradiation.

It is advantageous if the at least one transmission antenna and at least one reception antenna are embodied as an active multi-static antenna array. In this manner, the microwave signal transmitted by at least one transmission antenna is received by at least one reception antenna, and the modulus and phase position of the received signal is detected. The transmission and reception antenna in this context are arranged at spatially different positions.

Exemplary embodiments of the method according to the invention and the device according to the invention are presented by way of example in the drawings and explained in greater detail with reference to the following description. The drawings show.

Figure 1:
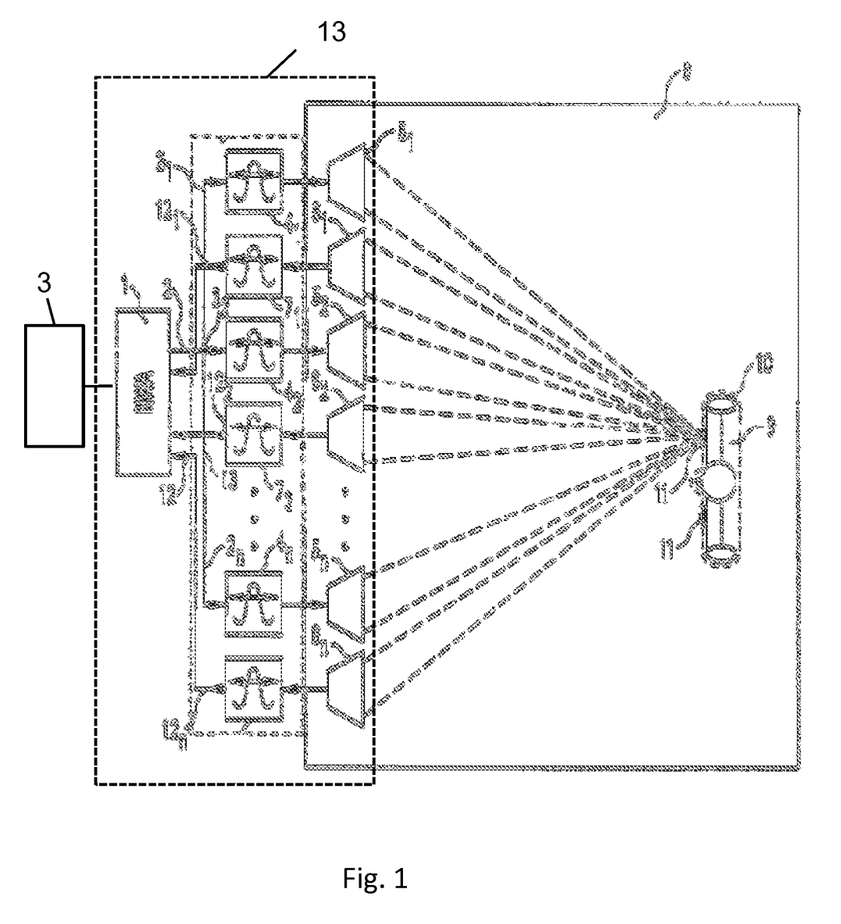
FIG. 1 an arrangement of transmission antennas and reception antennas which can be used for the method according to the invention and respectively the device according to the invention, in a plan view.

FIG. 1 shows an exemplary arrangement of transmission antenna $5_1, 5_2, \ldots, 5_n$ and reception antennas $6_1, 6_2, \ldots, 6_n$ in a two-dimensional antenna array 13, which can be used for the illumination of an object under investigation 9 with microwave signals. The microwave signal generated in a network analyser 1 is supplied via the connecting line 2 to a signal splitter, which is not illustrated, which splits the microwave signal into identical partial microwave signals and guides them in each case via a connecting line $2_1, 2_2, \ldots, 2_n$ to a transmission-end focusing sub-unit $4_1, 4_2, \ldots, 4_n$ of the focusing unit 3 associated with the respective microwave signal. In the individual transmission-end focusing sub-units $4_1, 4_2, \ldots, 4_n$, each partial microwave signal is conditioned, for example, with a digital beam-forming algorithm to the extent that the respective partial microwave signal is focused on the spatial point to be scanned, in each case by providing corresponding phase displacements in transmission antennas $5_1, 5_2, \ldots, 5_n$, for example, in horn antennas, connected to the focusing device 3. The partial microwave signals projected onto an object under investigation 9, for example, a human body, are reflected on the object under investigation 9 and also on hidden objects 11 kept concealed within the clothing 10, which is indicated with dotted lines.

The respectively reflected microwave signals are received in the associated reception antennas $6_1, 6_2, \ldots, 6_n$ and supplied to downstream reception-end focusing sub-units $7_1, 7_2, \ldots, 7_n$ of the focusing device 3. Via the connecting line $12_1, 12_2, \ldots, 12_n$, the received partial microwave signals are supplied to different ports of a vectorial multi-port analyser 1. There, the moduli and phases of the individual partial microwave signals relative to one another are registered, corresponding to the respective distance of the spatial point to be focused from each reception antenna $6_1, 6_2, \ldots, 6_n$. Instead of n transmission antennas $5_1, 5_2, \ldots, 5_n$, a reduced number of transmission antennas can also be used as an alternative. Moreover, only a single transmission antenna without transmission-end focusing can also be used. Furthermore, the number of reception antennas $6_1, 6_2, \ldots, 6_n$ can be varied corresponding to the desired reception-end focusing quality. The transmission-end and/or the reception-end focusing preferably takes place in a purely computational manner within a processing device 3 and is referred to as a synthetic focusing. A focusing through optical components, such as lenses, does not take place.

In the device according to the invention and respectively the method according to the invention, an antenna arrangement 14, such as the antenna array 13 illustrated by way of example, is operated in a bi-static or multi-static mode. In the bi-static mode, a transmission antenna transmits a microwave signal which is received by a reception antenna $6_1, 6_2, \ldots, 6_n$ spatially separated from the transmission antenna $5_1, 5_2, \ldots, 5_n$. In the multi-static mode, several transmission antennas $5_1, 5_2, \ldots, 5_n$ transmit microwave signals, whereas the reflected signal of every individual transmission antenna is received in each case by a plurality of reception antennas $6_1, 6_2, \ldots, 6_n$.

The antenna arrangement 14 operates in the near-field range, that is, the distance between the antenna arrangement 14 and the object under investigation 9 is only a small multiple of the dimensions of the antenna arrangement 14.

For the synthetic focusing of the received microwave signal, a back-propagation algorithm corresponding to the following equation can be used, for example:

$$R(x, y, z) = \sum_{f=1}^{n_F} \sum_{t_x=1}^{n_T} \sum_{r_x=1}^{n_R} M(f, t_x, r_x) \cdot e^{+j\frac{2\pi}{c_0}f\left|\vec{r}_{voxel} - \vec{r}_{t_x}\right|} \cdot e^{+j\frac{2\pi}{c_0}f\left|\vec{r}_{r_x} - \vec{r}_{voxel}\right|}.$$

In this context, M denotes the received microwave signal, $t_x$ and $r_x$ denote the position of a transmission antenna $5_1, 5_2, \ldots, 5_n$ and reception antenna $6_1, 6_2, \ldots, 6_n$ of the antenna arrangement 14. In this manner, a reflection value R is allocated to every object point (x,y,z) in the three-dimensional space. In order to increase the accuracy of the data, a measurement can be performed over various frequencies f. The reflection value R is then additionally summed over all available frequencies. However, the present invention is not restricted to this focusing algorithm.

Figure 2:
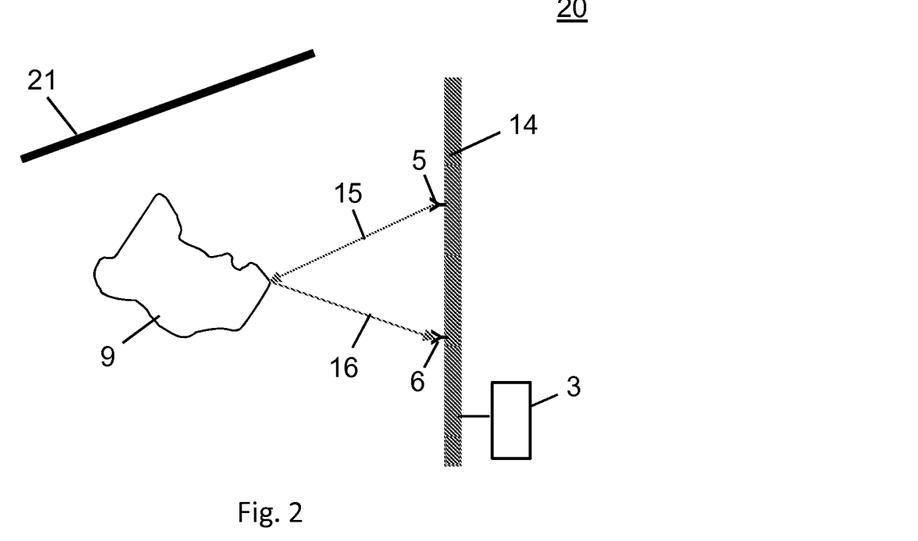
FIG. 2 a first exemplary embodiment of a device according to the invention with a microwave signal corresponding to a zero group of microwave signals which are received without reflection on the reflector element, in a schematic view.

FIG. 2 shows a first exemplary embodiment of a device 20 for extending the illumination of an object under investigation 9. An antenna arrangement 14 with at least one transmission antenna 5 and at least one reception antenna 6 is arranged at a distance from the object under investigation 9, which is not substantially larger than the spatial dimensions of the antenna arrangement 14. A reflector element 21 is now additionally arranged orientated towards the object under investigation 9. The reflector element 21 preferably provides a metallised surface from which the microwave signals are completely reflected. The reflector element 21 can be embodied, for example, as a planar, two-dimensional surface. However, the reflector element 21 can also have a cylindrically shaped surface, see FIG. 10, or a differently shaped surface.

The object under investigation 9 is illuminated with an electromagnetic microwave signal 15 which is radiated from the transmission antenna 5 of the antenna arrangement 14. The microwave signal 16 reflected from the object under investigation 9 is received by a reception antenna of the antenna arrangement 14. Such a microwave signal which is reflected from the object under investigation 9 without reflection on the reflector element 21 and received by a reception antenna 6 of the antenna arrangement 14 will be referred to below as a directly reflected microwave signal 37 or microwave signal of a zero group.

The device 20 further comprises a processing device 3 which is connected to the antenna arrangement 14. The processing unit 3 receives the received microwave signals from the antenna arrangement 14 and reconstructs from them an image of the object under investigation 9 using the synthetic focusing already described.

The microwave rays and their propagation paths, which are reflected by the reflector element 21 and used for the reconstruction of the object under investigation 9, will now be described with reference to FIGS. 3-7.

Figure 3:
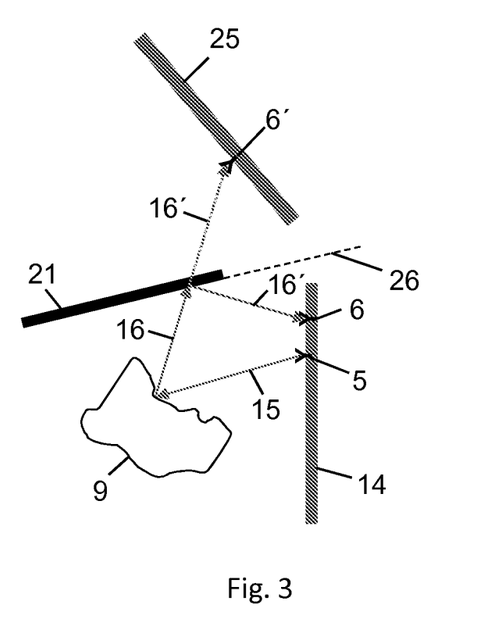
FIG. 3 the first exemplary embodiment of a device according to the invention as shown in FIG. 2 with a microwave signal corresponding to a first group of microwave signals, in a schematic view.

FIG. 3 shows the beam path of a first group of signals 34 which are used for the synthetic focusing of the object under investigation 9, in which a microwave signal 15 transmitted from a transmission antenna 5 is reflected from the object under investigation 9 as a microwave signal 16 in the direction towards the reflector element 21 and also received from the reflector element 21 by a reception antenna 6 of the antenna arrangement 14 as the microwave signal 16'. In this context, the signal 16 and 16' corresponds to a microwave signal which, with a straight-line propagation, would be received by a virtual reception antenna 6' of a virtual reception antenna arrangement 25. The position of the virtual reception antenna 6' corresponds to the real position of the reception antenna 6 reflected on the reflection axis 26.

Figure 4:
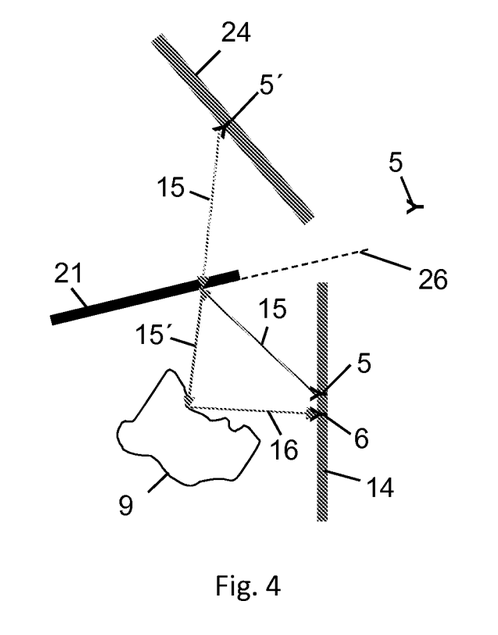
FIG. 4 the first exemplary embodiment as shown in FIG. 2 with a microwave signal corresponding to a second group of microwave signals, in a schematic view.

FIG. 4 shows, by way of example, microwave signals 35 of a second group of signals which are used for the synthetic focusing of the object under investigation 9. In this context, a microwave signal 15 transmitted from a transmission antenna 5 initially strikes a reflector element 21 and is reflected from there to the object under investigation 9 as a reflected microwave signal 15'. The signal 16 reflected from the object under investigation 9 is received by a reception antenna 6 of the real transmission and reception antenna arrangement 14. The propagation path of the transmitted microwave signal 15' corresponds to the signal 15 drawn with dotted lines, which is transmitted from a virtual transmission antenna 5' of a virtual transmission arrangement 24, in the case of a straight-line propagation in which the signal is not reflected from the reflector element 21. The position of the virtual transmission antenna 5' is obtained from the position of the real transmission antenna 5 which is reflected on the extended reflection axis 26 of the reflector element 21.

Figure 5:
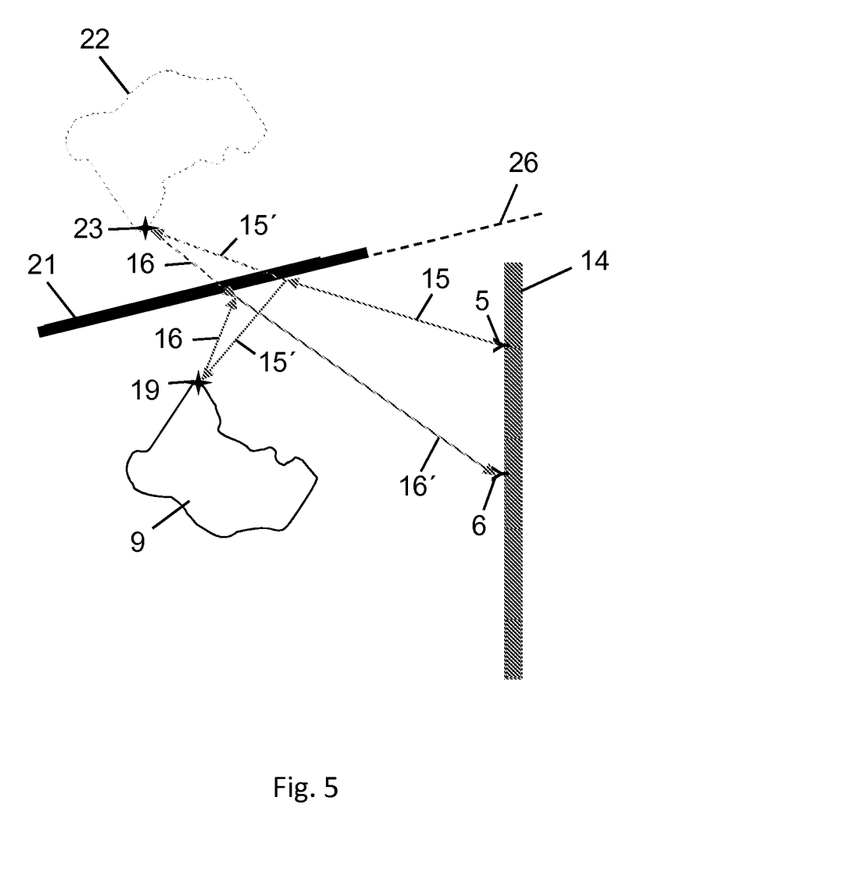
FIG. 5 the first exemplary embodiment according to FIG. 2 with a microwave signal corresponding to a third group of microwave signals, in a schematic view.

FIG. 5 shows a third group of signals 36 which is used by the arrangement of the reflector element 21 for the synthetic focusing and therefore for the reconstruction of an image of the object under investigation 9 in addition to the directly reflected microwave signals. In this context, the microwave signal 15 is transmitted from a transmission antenna 5 of the real transmission and reception antenna arrangement 14 and reflected by the reflector element 21 onto the object under investigation 9. The signal 16 reflected from the object under investigation 9 once again strikes the reflector element 21 and is reflected there and received as the signal 16' in the real reception antenna 6 of the antenna arrangement 14. The propagation path of the transmitted and respectively received signal 15, 15', 16, 16' corresponds, in the case of a straight-line continuation of the reflected signals, to a virtual object under investigation 22. The spatial point 23 of the virtual object under investigation 22 corresponds in this context to the spatial point 19 of the real object under investigation 9, which has been reflected on the reflection axis 26.

Figure 6:
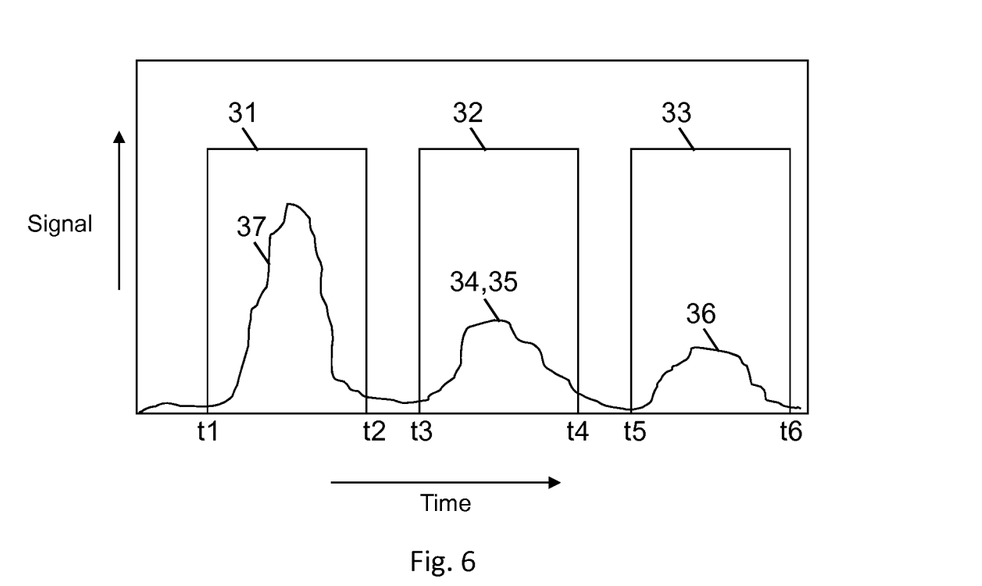
FIG. 6 an example according to the invention of a received signal subdivided into time-windows, in a schematic view.

FIG. 6 shows the microwave signals received from the real transmission and reception antenna arrangement 14. As already described, these have been detected in their modulus and the received phase. Using a Fourier transform, the signal is converted from the frequency domain into the time domain. The received microwave signal is therefore displayed according to its delay time. The directly reflected microwave signals 37 have the shortest propagation path and accordingly fall within a first time-window 31 in the antenna arrangement. The microwave signals of the first and second group of microwave signals corresponding to FIG. 3 and respectively FIG. 4 travel a longer propagation path and therefore fall within a second time-window 32 in the antenna arrangement 14. The limits $t_3$, $t_4$ of the first time window 32 are formed by a minimal and respectively maximal delay time of a microwave signal which is reflected from a virtual transmission antenna of the virtual transmission-antenna arrangement 24 via the object under investigation 9 to a real reception antenna 14 or respectively from a real transmission antenna 14 via the object under investigation to a virtual reception antenna of a virtual reception-antenna arrangement 25.

The limits $t_5$, $t_6$ of the second time window 33 are formed in a similar manner from the minimal and respectively maximal delay time of a microwave signal which is reflected from a real transmission antenna via the virtual object under investigation 22 to a real reception antenna in the real transmission antenna and antenna arrangement 14, determined. The limits $t_1$, $t_2$ of the zero time-window 31 are determined in the same manner in a minimal and respectively maximal delay time of the directly reflected microwave signal from the object under investigation 9.

In the subsequent synthetic focusing, the microwave signals M(t) of the zero group 37, that is, microwave signals of the zero time-window 31, are allocated to the real position of the transmission antenna and the real reception antenna. For the evaluation of the microwave signals M(t) of the first group 34 and second group 35, which are both disposed in the first time-window 32, the position of the real transmission antenna 14 and the position of the virtual reception antenna 25 is used, or respectively the position of the virtual transmission antenna 24 and the position of the real reception antenna 14 are used.

For the evaluation of the microwave signals M(t) of the third group 36, which are disposed in the second time window 33, the position of the real transmission-antenna arrangement 14 and the real reception-antenna arrangement 14 are used. However, the resulting image points correspond to a virtual object under investigation 22 reflected on the reflector element 21. To achieve a more clearly visible display of the object under investigation, the virtual object under investigation 22 is guided back by reflection onto an image of the real object under investigation 9 and superimposed on the images which result from the microwave signals from the zero and first time windows 31, 32. Since the received microwave signals from the first and the second time window are attenuated through losses from reflection on the reflector element and from the relatively longer delay time in air by comparison with the directly reflected microwave signal, these are advantageously weighted with a weighting factor which compensates this attenuation.

Figure 7:
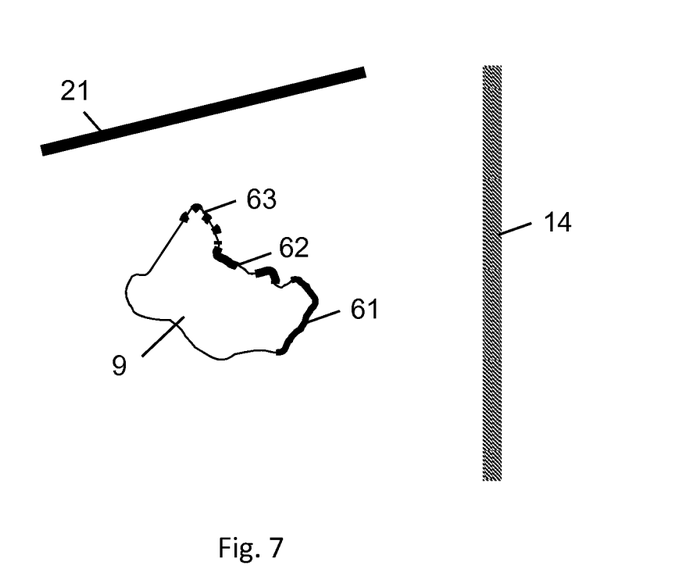
FIG. 7 an exemplary embodiment according to the invention of a device as shown in FIG. 2 with an object under investigation with extended image regions, in a schematic view.

FIG. 7 shows the object under investigation 9 together with the antenna arrangement 14 and the reflector element 21. The region 61 drawn with a continuous bold line is prepared as an image from microwave signals of the zero time-window 31. The region 62 marked with a dotted bold line can now be additionally displayed through the evaluation of the microwave signals of the first time-window 32 in addition to the image 61. The region 63 marked with a bold dotted line is determined through the synthetic focusing of the microwave signals from the third time window. This very clearly shows an extension of the illumination and therefore of the regions of the object under investigation 9 capable of being imaged.

Figure 8:
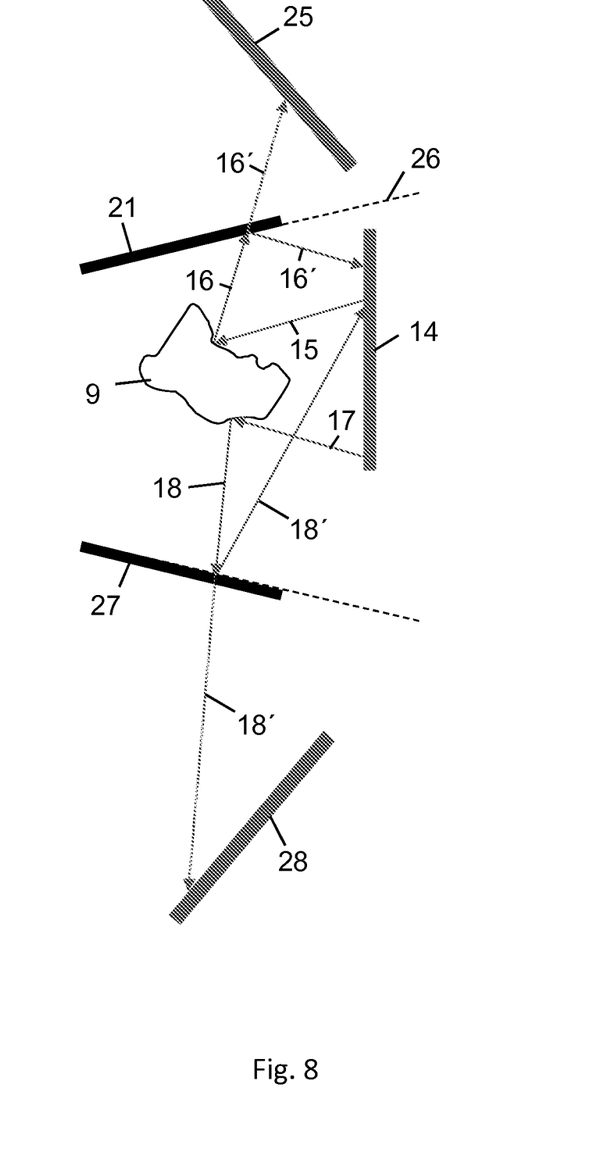
FIG. 8 a second exemplary embodiment of a device according to the invention with two reflector elements, in a schematic view.

FIG. 8 shows a second exemplary embodiment with two reflector elements 21, 27 and, by way of example, a propagation path of two microwave signals 15, 16, 16', 17, 18, 18' capable of being used for the imaging. In this context, alongside the microwave signals which are reflected from the object under investigation and from the first reflector and received in the antenna arrangement 14, the signals which are reflected from the object under investigation and from the second reflector element 27 and received by the antenna arrangement 14 are also used for the reconstruction of the object under investigation 9. The microwave signals 15, 16, 16' and respectively 17, 18, 18' and virtual reception-antenna arrangements 25, 28 have been drawn by way of example.

In this context, the position of virtual reflected transmission antennas and respectively reception antennas, as described in the previous example, are used for the synthetic focusing. In order to allocate the signals reflected from a further reflector element 27 and received in the antenna arrangement 14 within the synthetic focusing to the positions of the virtual reception-antenna arrangement 28 or respectively of a virtual transmission-antenna arrangement, which is not illustrated, the several reflector units 21, 27 are arranged respectively at a different spacing distance from the object under investigation 9, so that the delay times of the respectively reflected microwave signals 15, 16, 16', 17, 18, 18' do not overlap. With the use of several reflector units 21, 27, several regions which are not illuminated by directly reflected microwave signals can be imaged.

In an exemplary embodiment which is not illustrated, a movable reflector element is used. In this context, successive measurements of the object under investigation can be implemented with the reflector element which is arranged respectively at a different position relative to the object under investigation, and accordingly, different regions of the object under investigation 9 can be imaged in succession.

Figure 9:
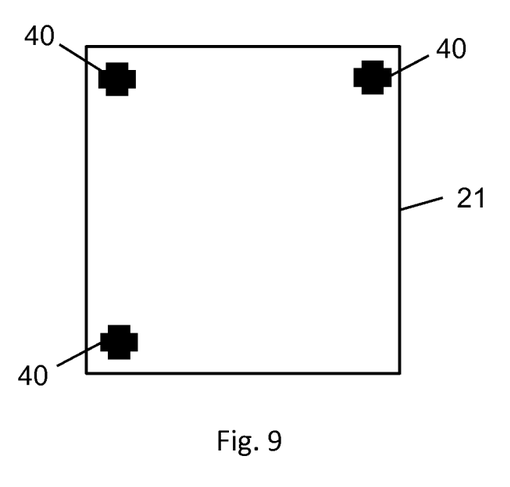
FIG. 9 a first exemplary embodiment of a reflector element according to the invention, in a lateral view.

FIG. 9 shows a reflector unit 21, which preferably comprises three regions 40 separated from one another, which each provide a diffuse reflecting surface. The regions 40 are preferably attached at the edge of the reflector element 21 and are recognisable when irradiated with microwave signals through their diffuse reflection characteristic. Using the synthetic focusing, the position of the regions 40 is determined and can be used, for example, in order to specify the position of the reflector element in the focusing algorithm. The regions 40 can also be punched regions or bulges.

Figure 10:
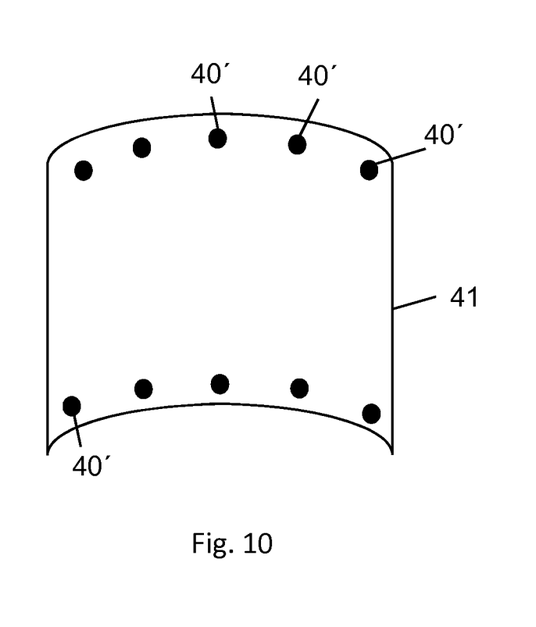
FIG. 10 a second exemplary embodiment of a reflector element according to the invention, in a perspective view.

FIG. 10 shows a further exemplary embodiment of a reflector element 41 with a cylindrical surface. In this context, regions 40' with a diffuse reflection characteristic are arranged along the upper and lower edge of the reflector element 41.

Figure 11:
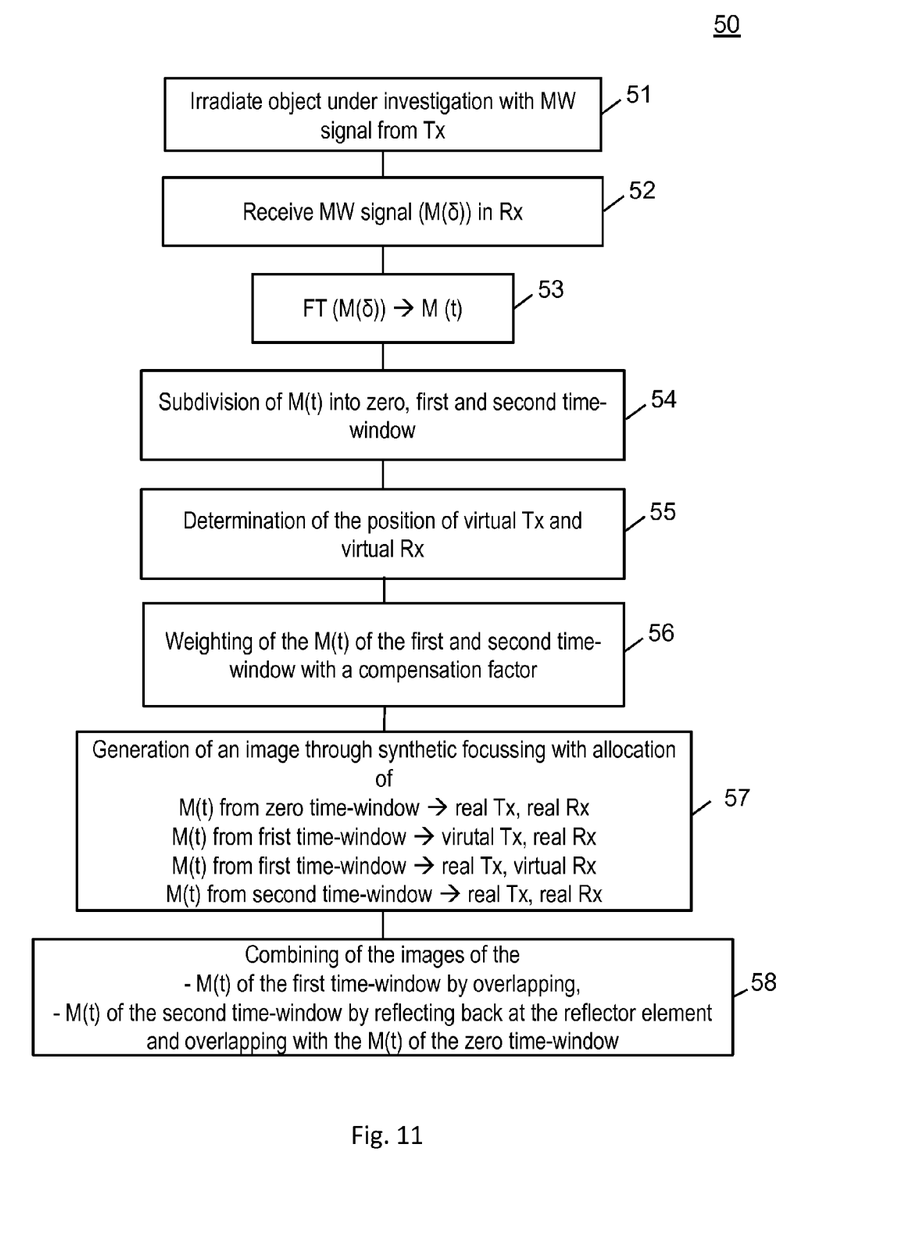
FIG. 11 a flow diagram of the method according to the invention.

FIG. 11 shows a flow diagram of the method for extending the illumination of an object under investigation with microwave radiation. In the first method step 51, an object under investigation is irradiated with a microwave signal from the transmission antenna Tx. In method step 52, microwave signals $M(\delta)$ are received at least in the reception antenna of an antenna arrangement. In the next method step 53, the received signal $M(\delta)$ is converted by Fourier transform into the time domain $M(t)$.

In step 54, a zero, first and second time-window, and also further time-windows in which the reflected microwave signals $M(t)$ strike the reception antenna corresponding to their propagation path, are determined with the use of several reflector elements. In this context, the limits $t_1$, $t_2$, $t_3$, $t_4$, $t_5$, $t_6$ are determined as described with reference to FIG. 6.

In the next method step 55, the position of the virtual transmission antenna (Tx) and of the virtual reception antenna (Rx) is determined by reflection of the real transmission antenna and the real reception antenna on the reflector element. Method step 55 can also be implemented before step 54 or after step 56. Optionally, the microwave signals of the first and second time window 32, 33 can be weighted with a compensation factor. This is specified in method step 56.

In the next method step 57, an image of the object under investigation is calculated by synthetic focusing of the received microwave signals, whereas the microwave signals 37 which are disposed in the zero time-window 31, are allocated to the position of the real transmission antenna and the real reception antenna. The microwave signals 34, 35 of the first time-window 32 are allocated to the position of the real transmission antenna and the virtual reception antenna and the position of the virtual transmission antenna and the position of the real reception antenna. Moreover, the microwave signals 36, which are disposed in the second window 33 are allocated to the position of the real reception antenna and the real reception antenna.

After the synthetic focusing, in method step 58, the images of microwave signals of the first time window 32 are optionally overlapped by overlapping with the image which has been generated from the directly reflected microwave signals of the zero time-window 31. The image of the object under investigation which has been generated through the reflected microwave signals of the second time window 33 is combined from the directly reflected microwave signals by reflection back to the reflector element and subsequent overlapping with the image.

Figure 12:
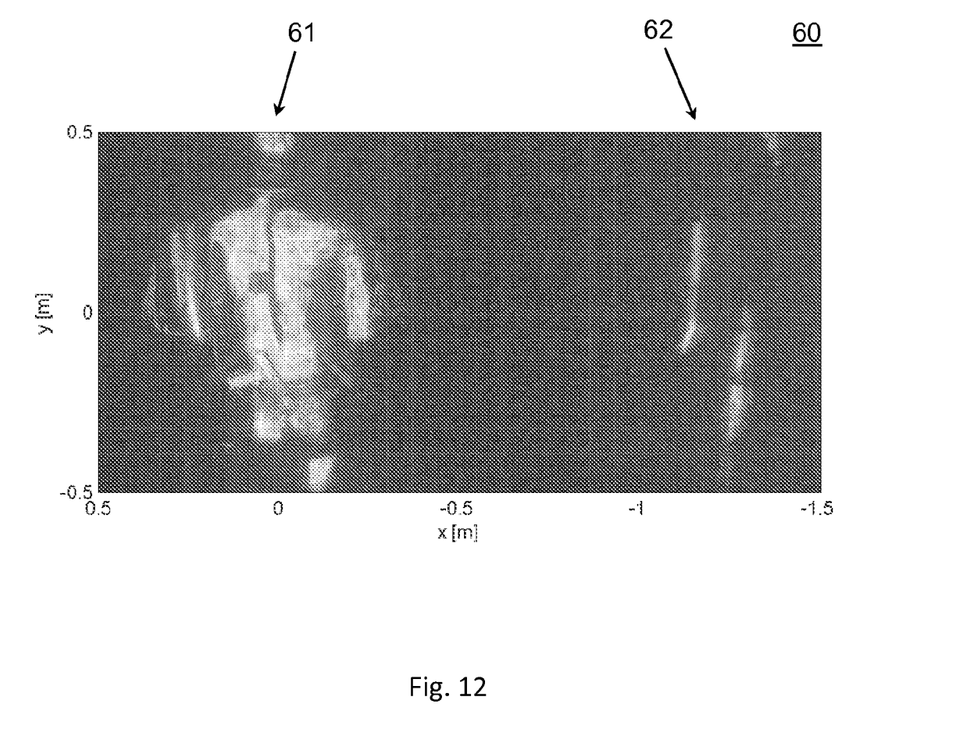
FIG. 12 an exemplary image of a human body as provided with the method according to the invention.

FIG. 12 shows an exemplary image 60 of an object under investigation, in this case a test dummy, which has been prepared with the device according to the invention and as specified according to the method of the invention. In this context, the image 61 displayed on the left of the picture is reconstructed from the directly reflected microwave signals 37. The image 62 and displayed in the right-hand half of the picture shows the same object under investigation, but was reconstructed from the microwave signals 34, 35 of the first time window 32. It shows the lateral region of the arm of the test dummy which is not visible in the image 61. Accordingly, the image 62 significantly expands the visible region of the object under investigation capable of being imaged.

All of the features described and/or illustrated can be advantageously combined with one another within the framework of the invention. The invention is not restricted to the exemplary embodiments described.

The invention claimed is:

1. A method for extending the illumination of an object under investigation, comprising:
   illuminating the object under investigation with an electromagnetic microwave signal which is transmitted from at least one transmission antenna;
   receiving by at least one reception antenna the microwave signal reflected from the object under investigation; and
   reconstructing an image of the object under investigation from the reflected microwave signal in a purely computational manner by synthetic focusing,
   wherein at least one reflector element is arranged orientated towards the object under investigation, and the microwave signals reflected from the reflector element and from the object under investigation are received in every reception antenna and used for the reconstruction of the image of the object under investigation in addition to microwave rays from a transmission antenna which strike the object under investigation without reflection on the reflector element and are received by the reception antenna without reflection on the reflector element, and
   wherein a virtual position of a virtual transmission antenna is determined through the reflection of a real position of a real transmission antenna on the reflector element, and a virtual position of a virtual reception antenna is determined through the reflection of the real position of a real reception antenna on the reflector element.

2. The method according to claim 1, wherein the microwave signals used for the synthetic focusing, which are transmitted from a transmission antenna, are reflected from the reflector element in a direction towards the object under investigation and reflected from the object under investigation to a reception antenna, and/or
   which are transmitted from a transmission antenna, are reflected from the object under investigation in a direction towards the reflector element and reflected from the reflector element to a reception antenna, and/or
   which are transmitted from a transmission antenna, are reflected from the reflector element onto the object under investigation, reflected from the object under investigation to the reflector element and reflected from there to a reception antenna.

3. The method according to claim 1, wherein only the microwave signals received in a respective real reception antenna which are received within a first time-window of which limits are formed by a minimal and respectively a maximal delay time of a microwave signal which is reflected from a virtual transmission antenna via the object under investigation to the real reception antenna or respectively from a real transmission antenna via the object under investigation to a virtual reception antenna are allocated in the synthetic focusing to a respective virtual transmission antenna and the respective real reception antenna and respectively to the respective real transmission antenna and the respective virtual reception antenna.

4. The method according to claim 3, wherein the microwave signals received in the respective real reception antenna which are received within a second time-window of which the limits are formed by the minimal and respectively maximal delay time of a signal which is reflected from a real transmission antenna via a virtual object under investigation reflected on the reflector element to a real reception antenna are allocated in the synthetic focusing to a real transmission antenna and a real reception antenna.

5. The method according to claim 4, wherein the determined position of the virtual object under investigation is allocated by reflection on the reflector element to a real position of the object under investigation.

6. The method according to claim 3, wherein the microwave signals which are received in the first and/or second time window are provided with a weighting factor which compensates attenuation of the microwave signal through reflection on the reflector element and attenuation of the microwave signal through an increase in the delay time in air.

7. The method according to claim 1, wherein several reflector elements are positioned orientated towards the object under investigation, and the microwave signals reflected respectively from a reflector element and from the object under investigation and/or the microwave signals reflected via several reflector elements and from the object under investigation, are received in at least one reception antenna and used for the reconstruction of the image of the object under investigation.

8. The method according to claim 7, wherein the several reflector elements are arranged at a respectively different spacing distance from the object under investigation in such a manner that the delay times of the microwave signals capable of being used respectively for the reconstruction of the image do not overlap.

9. The method according to claim 1, wherein the reflector element comprises at least three, mutually separate regions, which each provide a diffuse reflecting surface, and the position and the distance of the reflector element is determined from microwave radiation which is reflected from these regions.

10. A device for extending the illumination of an object under investigation, comprising:
at least one transmission antenna which transmits an electromagnetic microwave signal in a direction towards the object under investigation;
at least one reception antenna which receives the microwave signal reflected from the object under investigation; and
a processing unit configured to reconstruct an image of the object under investigation from the reflected microwave signal through a purely computational, synthetic focusing,
wherein at least one reflector element is arranged orientated towards the object under investigation, and every reception antenna is embodied to receive reflected microwave signals from the reflector element and from the object under investigation, and the processing unit is embodied to use for reconstruction of the image of the object under investigation the microwave signals reflected from the reflector element and from the object under investigation in addition to microwave rays from a transmission antenna which strike the object under investigation without reflection on the reflector element and are received by the reception antenna without reflection on the reflector element, and
wherein a virtual position of a virtual transmission antenna is determinable through the reflection of a real position of a real transmission antenna on the reflector element, and a virtual position of a virtual reception antenna is determinable through the reflection of a real position of a real reception antenna on the reflector element.

11. The device according to claim 10, wherein the processing unit uses the microwave signals for the synthetic focusing which are transmitted from a transmission antenna and reflected from the reflector element in a direction towards the object under investigation and reflected from the object under investigation to a reception antenna, and/or
which are transmitted from a transmission antenna, reflected from the object under investigation in a direction towards the reflector element and reflected from the reflector element to a reception antenna, and/or
which are transmitted from a transmission antenna, are reflected from the reflector element onto the object under investigation, reflected from the object under investigation to the reflector element and reflected from there to a reception antenna.

12. The device according to claim 10, wherein the position of the reflector element is variable.

13. The device according to claim 10, wherein several reflector elements are arranged orientated towards the object under investigation.

14. The device according to claim 13, wherein the several reflector elements are positioned at a respectively different spacing distance from the object under investigation, so that delay times of the microwave signals capable of being used respectively for the reconstruction of the image do not overlap.

15. The device according to claim 10, wherein the reflector element comprises at least three, mutually separate regions, which each provide a diffuse reflecting surface, and
wherein the processing unit determines the position and distance of the reflector element from microwave radiation which is reflected from the regions.

16. The device according to claim 10, wherein the at least one transmission antenna and at least one reception antenna are embodied as an active multi-static array.

* * * * *